(12) United States Patent
Cheng

(10) Patent No.: US 6,910,743 B2
(45) Date of Patent: Jun. 28, 2005

(54) STABLE WHEEL ASSEMBLY

(75) Inventor: Ming-Chuan Cheng, Taichung (TW)

(73) Assignee: Merits Health Products Co., Ltd., (TW)

( * ) Notice: Subject to any disclaimer, the term of this patent is extended or adjusted under 35 U.S.C. 154(b) by 0 days.

(21) Appl. No.: 10/678,159

(22) Filed: Oct. 6, 2003

(65) Prior Publication Data

US 2005/0073193 A1 Apr. 7, 2005

(51) Int. Cl.[7] .................. B60B 35/00; B60B 37/00; B62M 1/00; B60G 11/02
(52) U.S. Cl. ............... 301/133; 301/36.2; 301/111.01; 280/87.041; 280/124.174
(58) Field of Search .................. 301/124.1, 5.305, 301/5.301, 111.01, 111.06, 125, 131–133, 301/119, 111.03, 111.07, 126, 36.2; 267/36.1, 267/41; 280/124.111, 124.114, 124.171, 280/124.174, 87.01, 87.021, 87.041, 87.042, 280/87.05

(56) References Cited

U.S. PATENT DOCUMENTS

| | | | |
|---|---|---|---|
| 1,887,544 A | * | 11/1932 | Codd ..................... 301/36.3 |
| 2,208,599 A | * | 7/1940 | Ronning .............. 280/124.119 |
| 2,208,600 A | * | 7/1940 | Ronning .............. 280/124.119 |
| 5,924,710 A | * | 7/1999 | de Courcey Milne .. 280/87.042 |
| 5,971,413 A | * | 10/1999 | El-Kassouf ........... 280/124.111 |
| 6,279,930 B1 | * | 8/2001 | Chang et al. .......... 280/87.042 |
| 6,286,843 B1 | * | 9/2001 | Lin ........................ 280/11.28 |
| 6,299,186 B1 | * | 10/2001 | Kao et al. .............. 280/87.041 |

* cited by examiner

Primary Examiner—Russell D. Stormer
Assistant Examiner—Jason R. Bellinger
(74) Attorney, Agent, or Firm—Dennison, Schultz, Dougherty & MacDonald

(57) ABSTRACT

A stable wheel assembly has wheels, a connector, a wheel stand with a bracket and a resilient body. Each wheel has a center. The connector has two spindles and two protrusions. Each protrusion has a free end and an upright step integrally formed with the free end of the protrusion. The upright steps on the protrusions are mated with each other. The bracket is pivotally mounted on two protrusions with a fastener. When the scooter or electric motorcycle mounted the stable wheel assembly run on an uneven surface, the wheels is raised up and the protrusion connected to the raised wheels is pivoted around the fastener mounted inside the protrusion and bracket. Therefore, a scooter or an electric motorcycle with the stable wheel assembly can be prevented from turning over.

3 Claims, 4 Drawing Sheets

STABLE WHEEL ASSEMBLY

BACKGROUND OF THE INVENTION

1. Field of the Invention

The present invention relates to a wheel assembly, and more particularly to a wheel assembly that can provide a comfortable riding stance and prevent a scooter or an electric motorcycle from turning over when being ridden over rough terrain.

2. Description of Related Art

With reference to FIGS. 3 and 4, a conventional scooter or electric motorcycle has a wheel assembly. The wheel assembly has two wheels (60) respectively mounted at two sides, a spindle (61) and a wheel stand (62). The spindle (61) has a middle portion and a through hole (not shown). The spindle (61) is transversely mounted between the wheels (60), and the wheels rotate independently on the spindle. The wheel stand (62) is vertically mounted on the spindle (61). The wheel stand (62) has a distal end (not numbered), a proximal end (not numbered) and a bracket (621). The bracket (621) has a hole and is securely mounted on the distal end of the wheel stand (62) and is further mounted on the middle portion of the spindle (61). A threaded pin is inserted into the hole of the bracket (621) and the through hole of the spindle (61) and a nut (not shown) is screwed on the threaded pin so that the wheel stand (62) is pivotally mounted on the spindle (61) via the bracket (621).

The conventional wheel assembly has the following disadvantages:

1. When the conventional wheel assembly travels over a rough surface, the wheel (60) at one side is easily raised above the other because of the uneven surface. As the spindle (61) is mounted between the wheels (60), if the wheel at one side is raised, the scooter or the electric motorcycle having the wheel assembly is easily turned over.
2. The scooter or the electric motorcycle that is mounted with the conventional wheel assembly cannot reduce the shaking force when the scooter or the electric motorcycle over an uneven surface and so cannot to provide a comfortable riding stance for the rider.

The present invention provides a stable wheel assembly to mitigate the aforementioned problems.

SUMMARY OF THE INVENTION

The primary objective of the present invention is to provide a stable wheel assembly that has wheels, a connector, a wheel stand with a bracket and a resilient body. Each wheel has a center and a spindle. The connector has two protrusions and one of the protrusions is mounted on the spindle of one of the wheels. Each protrusion has a side with an upright step that is integrally formed with the protrusion at the side and can be mated into the upright step on the other protrusion to form the complete connector. The bracket is mounted on two protrusions and a pivot pin is inserted in the bracket and two protrusions.

When the scooter or electric motorcycle fitted with the stable wheel assembly travels over an uneven surface, the wheels are raised and the protrusion is rotated around the pivot pin mounted inside the protrusion and bracket. When the protrusion is rotated, the scooter or electric motorcycle fitted with the stable wheel assembly can be prevented from turning over and the resilient body can reduce shaking force to provide a comfortable travelling stance for the rider.

Other objects, advantages and novel features of the invention will become more apparent from the following detailed description when taken in conjunction with the accompanying drawings.

DETAILED DESCRIPTION OF THE PREFERRED EMBODIMENT

Figure 1:
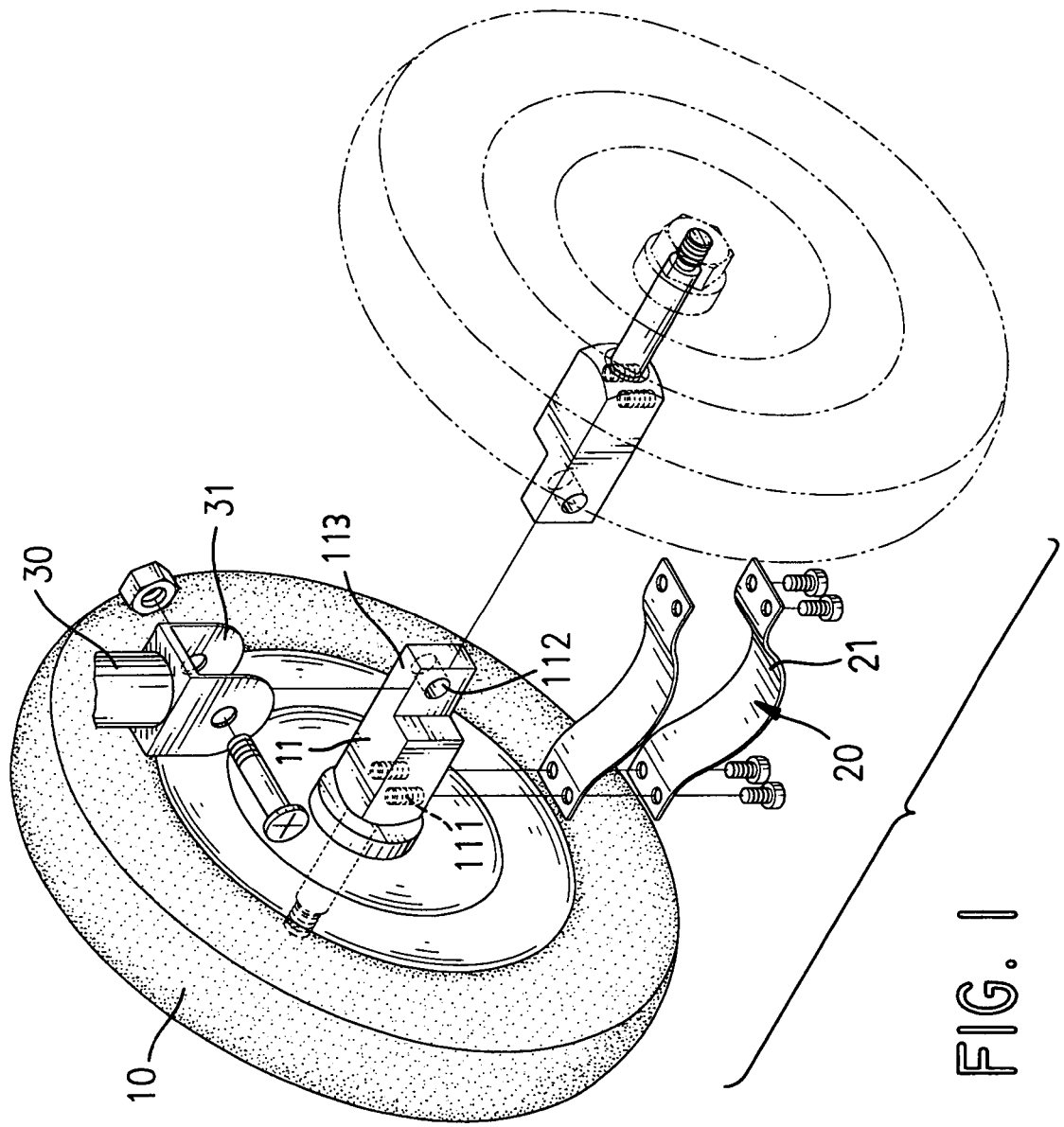
FIG. 1 is a perspective view of a stable wheel assembly in accordance with the present invention.
Figure 2:
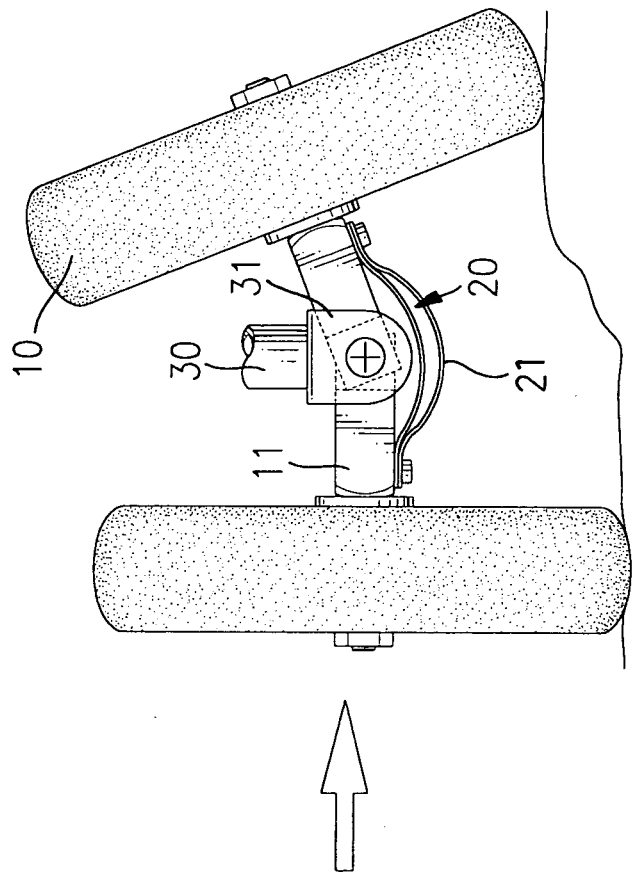
FIG. 2 is a front side view of the stable wheel assembly in FIG. 1 when travelling over an uneven surface.
Figure 2:
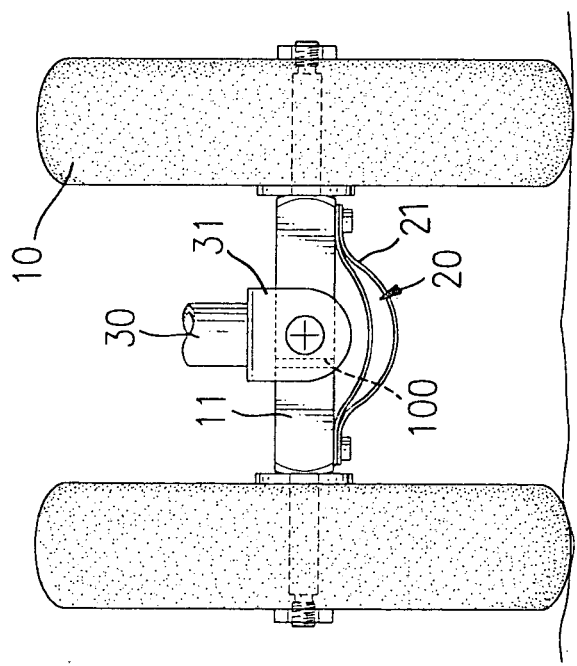
Figure 3:
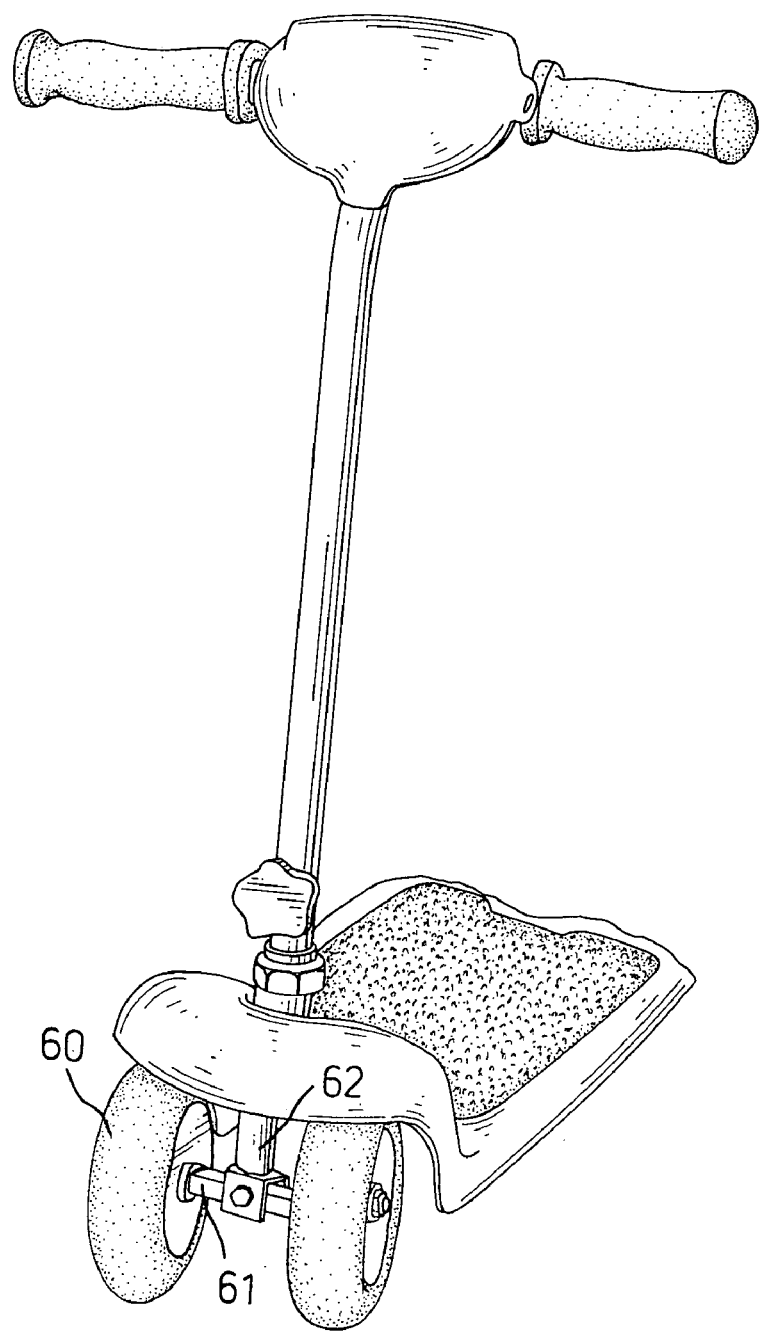
FIG. 3 is a partial perspective view of a conventional wheel assembly in accordance with the prior art.
Figure 4:
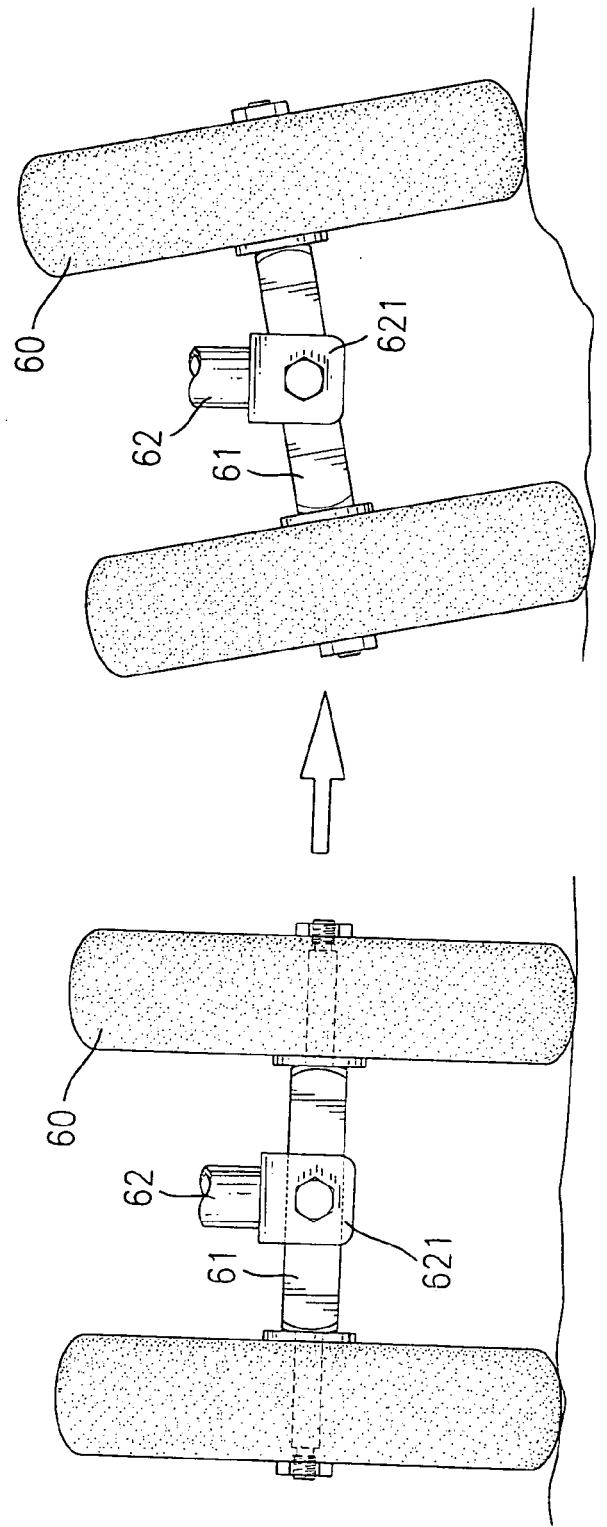
FIG. 4 is a front side view of the conventional wheel assembly in FIG. 3 when travelling over an uneven surface.

With reference to FIGS. 1 and 2, a stable wheel assembly in accordance with the present invention has a connector (not numbered), at least two wheels (10), a resilient body (20) and a wheel stand (30). The connector has two ends (not numbered), two spindles (not numbered) and two protrusions (11).

Each end of the connector has at least one wheel (10) rotatably mounted on the end. Each wheel (10) has a center (not numbered). Each spindle has a first end (not numbered) and a second end (not numbered). The first end of the spindle is mounted through the center of the wheel (10) and the second end of the spindle is connected to one of the protrusions (11).

Each protrusion (11) has a free end (not numbered) and an upright step (113) defined on the free end, and the upright steps (113) on the wheels (10) are faced to and fitted with each other to achieve a complete connector. The protrusion (11) can be various types, in a preferred embodiment of this invention, the protrusion (11) can be a quadratic prism with the upright step (113) or be a cylinder with an upright step. When the upright steps (113) are assembled, each upright step (113) to the faced protrusion (11) will leave a gap (100). A through hole (112) is defined across two upright steps (113). One or multiple threaded holes (111) are vertically defined through each protrusion (11) and near the spindle.

The resilient body (20) is used for reducing the shake of the scooter or electric motorcycle when it travels over uneven terrain. The resilient body (20) is mounted under the two protrusions (11) of the connector and has two resilient straps (21). The resilient straps (21) are arcuate in shape and one of the resilient straps (21) is mounted over the other one and leaving a space (not numbered) between two resilient straps (21). The resilient body (20) has two free ends (not numbered) and one or multiple holes (not numbered) are defined in each free end to correspond to the threaded holes (111) in the respective protrusions (11). Multiple threaded pins (not numbered) are inserted into the aligned pairs of holes and the threaded holes (111) so that the resilient body (20) can be fixed under the connector.

The wheel stand (30) is mounted on the two protrusions (11) of the connector and on a top face opposite from the resilient body (20), via a bracket (31). The wheel stand (30) has a distal end (not numbered) and the bracket (31) is mounted at the distal end. The bracket (31) is further mounted on the protrusions (11) and has a transverse hole (not numbered). When the bracket (31) of the wheel stand (30) is mounted on the combined protrusions (11), the transverse hole is aligned with the aligned through holes (112) of the protrusions (11). A pivot pin (not numbered) is inserted into the aligned transverse holes of the bracket (31) and the through holes (112) of the protrusions (11), then a nut (not numbered) is threaded on the pivot pin to pivotally connect the connector to the wheel stand (30).

With reference to FIG. 2, when a scooter or an electric motorcycle fitted with the wheel assembly in accordance with the present invention travels over uneven terrain, one wheel (10) and the respective protrusion (11) will be pivotally raised because of stones etc. Because the connector has the mated protrusions (11) and the gap (100) is defined between each upright step (113) of one protrusion (11) and the end face of the other protrusion (11), Each protrusion (11) can freely and independently pivot relative to the wheel stand (30). Furthermore, when a scooter or an electric motorcycle is fitted with the stable wheel assembly in accordance with the present invention, the resilient body (20) can reduce the shake force emanating from travel over a rough terrain.

The stable wheel assembly in accordance with the present invention has the following advantages:

1. The protrusions (11) can be pivoted around the pivot pin that is mounted inside the protrusions (11) and the bracket (31), and so the scooter or electric motorcycle will not incline because the raised wheel (10) absorbs the varying terrain.
2. The stable wheel assembly has the resilient body (20) to reduce the shaking force emanating from the rough terrain and so a rider will feel comfortable.

Even though numerous characteristics and advantages of the present invention have been set forth in the foregoing description, together with details of the structure and function of the invention, that the disclosure is illustrative only, and changes may be made in detail, especially in matters of shape, size, and arrangement of parts within the principles of the invention to the full extent indicated by the broad general meaning of the terms in which the appended claims are expressed is to be understood.

What is claimed is:

1. A stable wheel assembly having:
    a connector with two ends and each end of the connector having at least one wheel rotatably attached to the end, and each wheel having a center;
    wherein the connector has
        two spindles each having a first end mounted through the center of the at least one wheel to which the spindle is attached and a second end; and
        two protrusions securely connected respectively to the second ends of the spindles and each having
            a free end;
            a first upright step defined on the free end; wherein the first upright step on one of the protrusions is mated to a second upright step on the other protrusion to form the connector; and
            a through hole being transversely defined through the first and the second upright steps on the protrusions;
    a wheel stand with a bracket and the bracket mounted on the protrusions, having a hole aligned with the through holes in the protrusions;
    a pivot pin inserted into the aligned transverse holes of the bracket and the through holes on the protrusions to pivotally connect the connector to the wheel stand; and
    a resilient body mounted between the protrusions.

2. The stable wheel assembly as claimed in claim 1, wherien the resilient body has two resilient straps with two free ends;
    multiple holes are defined on the free ends; and
    multiple threaded pins; and
    the protrusions have multiple threaded holes aligned with the holes on the free ends of the resilient straps, wherein the multiple threaded pins are mounted respectively through the holes in the free ends of the resilient straps and are screwed into the aligned threaded holes in the protrusions.

3. The stable wheel assembly as claimed in claim 1, wherein the protrusions of the connector are quadratic prisms, wherein a gap between each respective upright step and the faced protrusion.

* * * * *